(12) United States Patent
Benjamin et al.

(10) Patent No.: US 6,211,814 B1
(45) Date of Patent: Apr. 3, 2001

(54) METHOD FOR SOFTWARE SCAN CONVERSION OF TARGET IDENTIFICATION DATA IN A GENERAL PURPOSE COMPUTER (75) Inventors: Scott Jon Benjamin, Lakeville; Martin John Andrusiak; Robert James Monson, both of St. Paul, all of MN (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/408,206

(22) Filed: Sep. 28, 1999

(51) Int. Cl.[7] .................................. G01S 7/10; G01S 7/04
(52) U.S. Cl. ............................................ 342/185; 342/195
(58) Field of Search ................................. 342/175, 176, 342/185, 186, 195, 197

(56) References Cited

U.S. PATENT DOCUMENTS

| | | |
|---|---|---|
| 5,036,326 | 7/1991 | Andrieu et al. . |
| 5,315,305 * | 5/1994 | Noll ...................................... 342/185 |
| 5,923,285 | 7/1999 | Andrusiak et al. . |
| 6,140,955 * | 10/2000 | Andrusiak et al. .................. 342/185 |

* cited by examiner

*Primary Examiner*—Ian J. Lobo
(74) *Attorney, Agent, or Firm*—Glenn W. Bowen; Patrick M. Hogan

(57) ABSTRACT

A process is provided for near real-time or real-time software based scan conversion in a general purpose computer. The general purpose computer receives data via a digital network comprising range scaled and window detected radar video and antenna azimuth data in polar coordinate format according to the Andrusiak et. al. U.S. Pat. No. 5,923,285. The general purpose computer integrates the polar data into a polar buffer prior to conversion to Cartesian coordinates for display. This process de-couples the polar buffer from the coordinate conversion process so that the polar buffer process keeps up with incoming real-time data.

The coordinate conversion process is given some portion of the remaining processor bandwidth such that even if it does not keep up with the real-time rate of the radar, it will display all target information. The polar buffer processing involves integration of the new data with old data in the polar buffer in order to preserve target information until it has been displayed. The polar buffer processing also involves detection of data that changed from the previous scan and decay of data from prior scans when extracting data from the polar buffer prior to conversion to Cartesian display coordinates. The coordinate conversion process bypasses unchanged data to conserve time and displays changed data using improved hole-filling and apex removal methods.

13 Claims, 2 Drawing Sheets

METHOD FOR SOFTWARE SCAN CONVERSION OF TARGET IDENTIFICATION DATA IN A GENERAL PURPOSE COMPUTER

BACKGROUND OF THE INVENTION

1. Field of the Invention

The invention relates generally to high-speed coordinate scan conversion of radar or sonar target identification data coordinates for video presentation and more particularly to programmed software, custom hardware, or combined software and hardware video coordinate conversion. The invention also relates to radar or sonar video distribution and more particularly to a system that allows for the distribution of audio, video and computer data as well as radar or sonar data, via a digital data network. The preferred embodiment of the invention is for radar systems, and the invention is described by reference to such systems herein.

2. Description of the Related Art

Traditional radar video distribution has been implemented with a central analog radar switchboard which accepts inputs from multiple radars, and provides outputs to a number of dedicated radar display consoles. The switchboard used a switch matrix to deliver one selected input radar video signal to each radar display console. Such systems were dedicated to this purpose and generally were large and expensive. Recent developments in very high-speed digital networks make feasible the distribution of digitized radar video over these digital networks, in addition to television video, audio, and computer data.

U.S. Pat. No. 5,923,285 entitled "Low Bandwidth Digital Radar Video Distribution System," issued Jul. 13, 1999 to Martin J. Andrusiak, et al., describes a system architecture for distribution of digitized radar video on a modern computer network and is hereby incorporated by reference into this document. This system architecture enables software scan conversion within a general purpose computer by eliminating the need for dedicated hardware within the general purpose computer to capture and convert the radar video and azimuth signals from analog to digital form. It also improves the feasibility of software scan conversion within a general purpose computer because it substantially reduces the amount of data that needs to be processed for display.

Scan conversion is the process of converting radar data from a polar coordinate system (range and azimuth) to the Cartesian coordinate system (x, y) required for modern raster displays, typically in plan position indication (PPI) format. The scan converter may also allow the operator to select a unique view of the radar The options for this view include range scale, (the range of radar data represented on the display), and offset, (the relative location of the radar origin on the display). Centered PPI is defined as a PPI display, in which the radar origin is at the center, while offset PPI is defined as a PPI display in which the radar origin is not at the center of the display and may be off the display. While PPI is the most common radar display format, other scan conversion formats, such as range-height indication (RHI), B-Scan and A/R-Scan (amplitude-range) exist and may be implemented with the present invention.

Numerous types of such systems have been developed for providing the conversion of (r,θ) information into (x, y) information. The majority of these have relied on relatively complex hardware-dominated systems for providing the scan conversion In the past, such complex hardware systems were required to achieve the high speed needed to process the information being received from the radar in real-time, U.S. Pat. No. 6,140,955 titled "Ruler Algorithm for PPI Rectangular Radar Scan Converter with Staircase Line Drawing," filed in the name of Martin 3. Andrusiak, et. al., describes a scan conversion algorithm that is used as the basis for the scan conversion improvements described in this document, and is hereby incorporated by reference into this document.

Modern general purpose computers typically operate under the control of an operating system. Many of these operating systems support multi-tasking which means several programs may appear to operate simultaneously although each is allocated a portion of time for execution. The priority of tasks may also be adjusted to optimize system performance. These types of operating systems provide unpredictable amounts of CPU time to any given task. This presents a problem for processing real-time continuous data requiring some minimum amount of CPU time in order to keep up.

Modern CPUs are getting fast enough that it is often possible to perform scan conversion completely in software. However, the available CPU processing power may limit the display size, resolution and radar data pulse rate and rotation rates which may be achieved by a software scan converter. The unpredictable behavior and time varying loading of multi-tasking operating systems may also further complicate the problem of keeping up with real-time data. The present invention provides software scan conversion on a general purpose computer when the general purpose computer is provided range scaled and window detected digital radar video according to the Andrusiak, et. al., U.S. Pat. No. 5,923,285.

Target data from one or more radar or sonar systems may be mixed to provide multiple and composite images. U.S. Pat. No. 5,036,326 entitled "Method and Device for the Display of Several Radar Images in a Single Mosaic," issued Jul. 30, 1991 in the names of Jean-Pierre Andrieu, et al., shows a method and device for the display of several radar images in a single mosaic image. The present invention also provides a network-based system that is also capable of providing mosaic images with enhanced flexibility, reduced cost, and optimal display quality.

SUMMARY OF THE INVENTION

A method of displaying real-time input target identification data on a display screen of a digital computer, which may have a non-real time operating system, proceeds by integrating the storage of said target identification data into a polar data buffer memory as the data is received with stored target identification data that was previously received. The data is then extracted from the polar data buffer memory and displayed on a display screen at a rate compatible with the digital computer. The stored target identification data in the polar data buffer memory may be modified by a decay function after it has been presented on the display screen in order to age or fade old target identification data. This decay function may simply decrement the stored target identification data by a predetermined decay value. The polar data buffer memory may also record, during the integration and decay operations, which target identification data has been changed from that most recently displayed. The source of the target identification data may be either radar or sonar systems.

The data may be converted from polar to rectangular, or Cartesian coordinates by an improved software scan conversion program that uses said recorded change information to reduce redundant display update operations. The improved software scan conversion program also detects consecutive polar coordinate data bits which map into the same Cartesian coordinate data bits, and then maps these consecutive polar coordinate data bits into the Cartesian coordinate data bits in a single display update.

The software scan conversion program itself is integrated with a method of converting and displaying radar data that is supplied by one or more analog radar systems, over a digital network, to display systems which include a digital computer executing said software scan conversion program. In this method, the analog radar is digitized, then range compression is applied to the digitized video data followed by window detection to provide digital range compressed, window detected video data. The digital range compressed, window detected video data is then transmitted over a digital network to the display systems. Control signals from the display systems select the images to be displayed.

BRIEF DESCRIPTION OF THE DRAWINGS

The present invention is described by reference to the drawings in which.

DESCRIPTION OF THE PREFERRED EMBODIMENT

Figure 1:
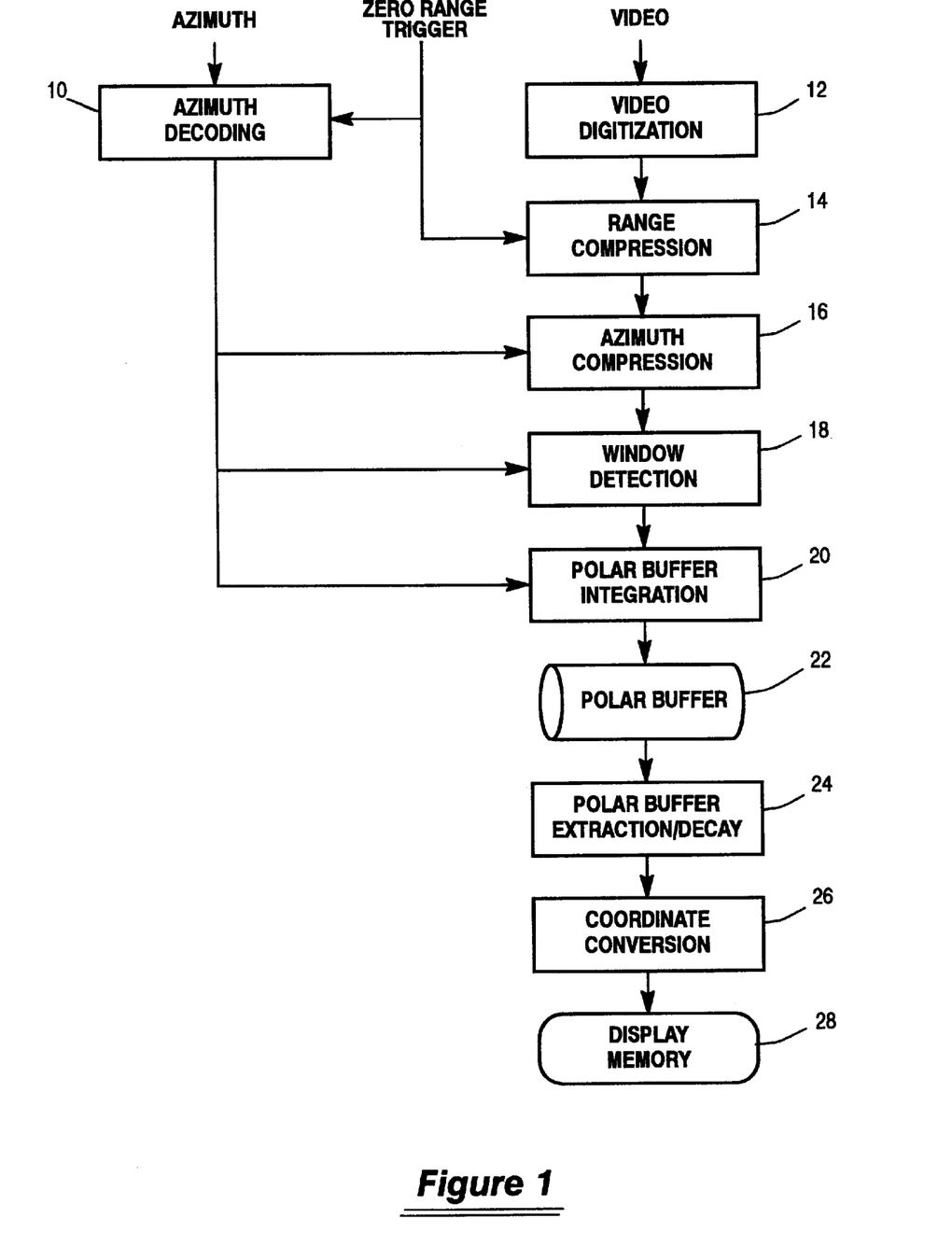
FIG. 1 is an overall flow diagram of a process that realizes the processing technique of the present invention.

A process flow for realizing the technique of the present invention is depicted in FIG. 1. The radar outputs form the inputs to the process. These include antenna position, range zero trigger and radar video signals. The antenna position signals indicate the direction (azimuth and/or elevation) of the radar pulse. For typical rotating radar systems, antenna position is conventionally and hereafter referred to as azimuth. The range zero trigger indicates the time at which the radar pulse is fired. The round trip time from the range zero trigger to the radar video return provides the indication of the range (distance) from the radar to the target. The rate of the range zero trigger signal is defined as the pulse repetition frequency (PRF). The amplitude of the radar video represents a measure of the radar echo return signal after various types of signal processing.

The azimuth decoding sub-process 10 detects the antenna position at the range zero trigger time. The azimuth decoded signals of movable antennas are representative of antenna position and are thus needed for an azimuth compression sub-process 16, if utilized, and for the window detection sub-process 18 and the polar memory integration process 20, which are described subsequently. The antenna position is converted from the particular radar format to a digital value with typically 10 to 14 bits of resolution. Conventional rotating radar antennas produce sequential azimuth numbers. The rate of rotation is measured in revolutions per minute (RPM) Random scanning radars produce corresponding random (non-sequential) azimuth numbers.

The video digitization sub-process 12 converts the analog video amplitude to a series of digital values. The conversion rate is determined by the bandwidth of the radar video and the Nyquist Theorem, which requires the sampling frequency to be at least two times the bandwidth of the signal being sampled. A typical radar may have a video bandwidth of 20 MHz, which dictates a minimum sample rate of 40 MHz. The digital values typically provide 4 to 8 bits of resolution.

The range compression sub-process 14 converts the digital samples to range bins. The range scale of a display is customarily defined as the range represented on the display as measured from the center to the closest edge along an axis. The display resolution determines the number of pixels from the center to edge. The sampling period determines the range represented by each video sample. A range bin corresponds to a pixel along the display axes. The range scale factor is the compression ratio required to achieve the desired range scale. To preserve target information, the range compression sub-process performs peak detection among the compressed samples resulting in a range bin. For example, with a 1024×1024-pixel display, the range scale corresponds to 512 pixels. A sample frequency of about 42 MHz corresponds to about 512 samples per radar mile (2000 yds.). A range scale of 8 miles would be achieved with a range scale factor of 8:1.

The optional azimuth compression sub-process 16 may be used to reduce the effective pulse repetition frequency (PRF). This is achieved by performing peak detection on corresponding range bins from consecutive radar pulses. A dwell factor is determined by the beam-width overlap on successive radar pulses. Dwell factor is defined as the number of consecutive radar pulses which detect a stationary point target per radar rotation (PRF/(RPM/60)/360*beam width) ("/" represents division). The maximum permissible azimuth compression factor without loss of target separation is half of the dwell factor. This is only applicable to a rotating radar. For example, a radar with a PRF of 4000 Hz, a rotation rate of 60 RPM and a beam-width of 0.7 degrees allows a maximum loss-less compression factor of 4000/(60/60)/360*0.7/2=3.9.

The window detection sub-process 18 extracts the peak-detected range bin data which map into pixels that will be visible on the desired Cartesian display region. Those range bins that do not map into the display area for this embodiment will not be visible and may be discarded.

The prior art process for scan conversion proceeds from the window detection sub-process 18 directly to the coordinate conversion sub-process 26. The current invention modifies this flow by inserting a polar buffer 22 between these processes to de-couple the radar data input and display rates and store an accumulated history of prior scans. The polar buffer may also contain flags for marking changed data. The polar buffer integration sub-process 20 performs integration of new data into the polar buffer. The polar buffer extraction sub-process 24 extracts data to be forwarded for coordinate conversion and display and may also perform a decay function to modify the accumulated history stored in the polar buffer.

U.S. Pat. No. 5,923,285 entitled "Low Bandwidth Digital Radar Video Distribution System," issued Jul. 13, 1999 to Martin J. Andrusiak, et al., describes a system architecture which essentially modifies the prior art process by inserting a digital computer network between the window detection sub-process 18 and the coordinate conversion sub-process 26. The system architecture of the present invention may similarly be modified by the insertion of a digital computer network either before or after the polar buffer process steps. This also enables the integration of multiple sensor data sources onto the same display. If the network is inserted after the polar buffer processing, then each sensor data source would have a separate polar buffer and would allow different decay rates. If the network is inserted prior to the polar buffer processing, then each of the multiple sensor data sources may be integrated into either the same or separate polar buffers. If separate polar buffers are used then each sensor may support a different decay rate.

The coordinate conversion sub-process 26 maps the range bins to display pixels. For PPI display format this consists of converting polar range bin coordinates to Cartesian display pixel coordinates. Each radar pulse is drawn on the display as a radial line. The basic equations for converting polar coordinates of range and azimuth (r, $\Theta$) to Cartesian coordinates (x, y) are: $x = r \cos \Theta$, $y = r \sin \Theta$. The two main problems in this process are apex removal and hole filling. Radial lines converge near the origin where many polar coordinates map to the same pixel coordinate in Cartesian space, forming an apex. Additional apexes occur when two consecutive range bins map to a single pixel on diagonal lines Combining many polar data points into one pixel is referred to as apex removal. Radial lines diverge away from the origin, such that one polar coordinate may map into many Cartesian pixel coordinates. Mapping to a single pixel coordinate leaves holes in the display, which may appear as spokes. Eliminating these holes is referred to as hole filling or spoke filling. These holes may be eliminated by drawing additional radial lines with enough azimuthal resolution to paint all the display pixels. This method, however, results in additional convergences, which require more apex removal.

The display memory 28 is used to store a raster display image that corresponds to the visible display pixels. This memory is updated with pixels from the coordinate conversion sub-process. This update may be performed as a read-modify-write operation in which the peak of the new and current value is stored to each pixel location being accessed. Peak detection update resolves the apex removal problem by preserving the maximum target value at any pixel and allows for a history of targets to be maintained. However, this technique requires that a decay process be performed on the data in display memory to prevent infinite persistence of displayed targets. Also, the read-modify-write display update process can be inefficient to implement in a general purpose computer so it may be desirable for increased performance to only perform display writes This requires all apex removal to be completed prior to writing the display.

Figure 2:
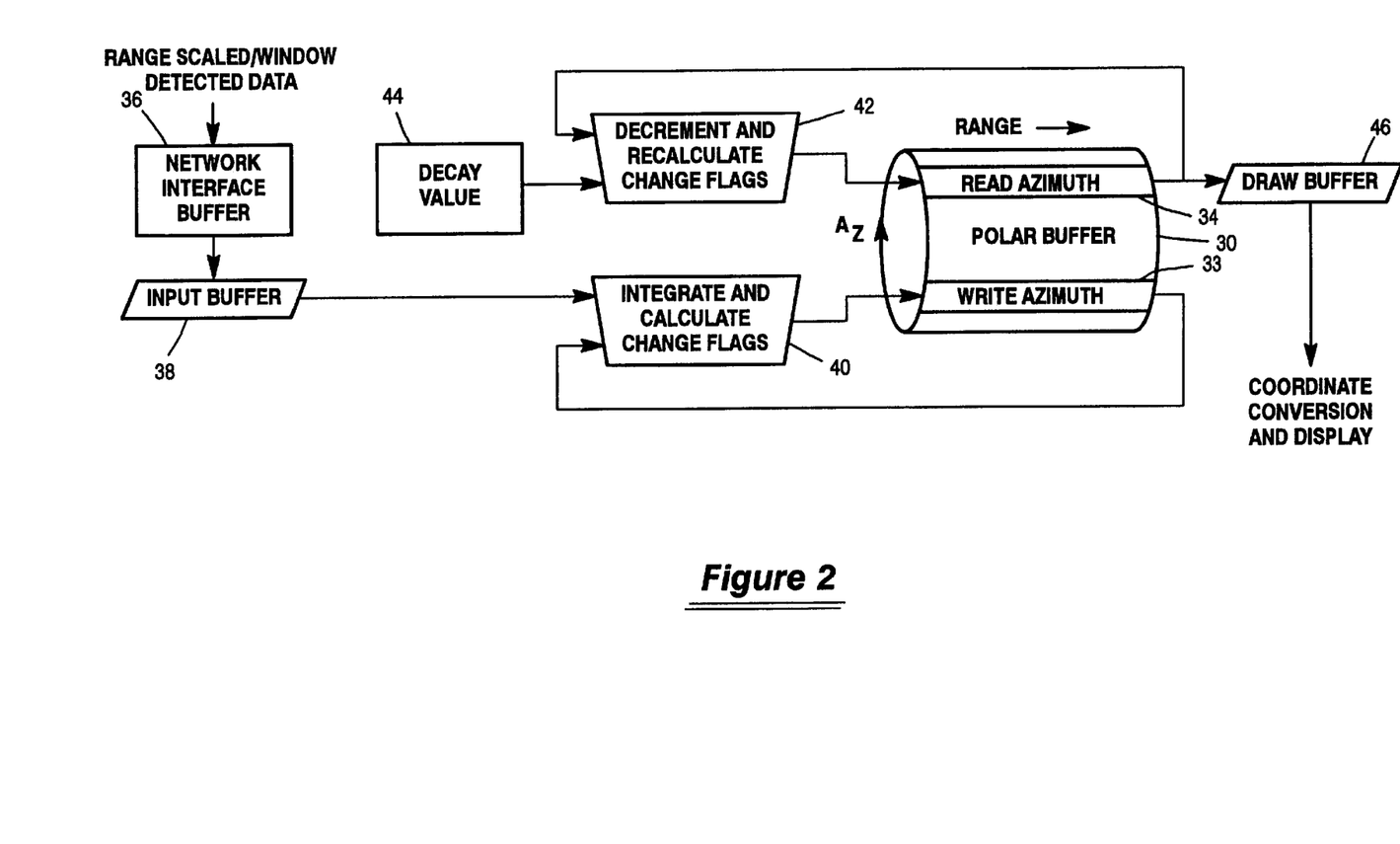
FIG. 2 is a data flow diagram of the portion of the process pertaining to the present invention.

FIG. 2 depicts the data flow and processing related to the polar buffer. The polar buffer 30 is a two-dimensional data array representing one full scan of the radar The primary index is an azimuth number represented as a binary azimuth measurement (BAM) which involves dividing a circle by an even power-of-two angles (e.g. 4096). The secondary index is range bin number The number of range bins may vary for each BAM depending on the display size, position and offset. Therefore, although the polar memory is described as a two-dimensional array, many other data structure implementations are possible. The polar buffer functions as a circular buffer with a write azimuth 33 pointer indicating the azimuth number which most recently received data and a read azimuth 34 pointer indicating the next azimuth number to be processed for display.

The polar buffer integration sub-process 20 updates the polar memory buffer by comparing the old data in the buffer to the new data coming from the radar. To handle the situation where data is read from the polar buffer at a slower rate than it is written, the integration process 40 selects the maximum of the old value and the new value for writing to the polar buffer. A flag may also be determined for each radar pulse, and/or each individual range bin in the polar buffer that when set indicates new data has been written to the polar buffer and when cleared indicates that the data has been read and displayed. This flag may be used to reduce redundant display update operations, since unchanged data may not need to be redisplayed. Many other integration functions are possible to perform various filters on data from scan to scan. For example, a static background may be removed from the display by saving in the polar buffer a long term average of the most recent scans and then subtracting this average from the displayed pixels.

The polar buffer extraction and decay sub-process 24 reads each pulse of data from the polar buffer into a draw buffer 46 and passes it to the coordinate conversion process. The data may be decayed by subtracting a stored decay value 44 during the decrement and recalculate change flag process 42. If change flags exist in the polar buffer, they are cleared for the pulse of data after data has been extracted into the draw buffer. The change flags may then be re-set by the decay sub-process if the decayed data is different from the last displayed value, which will occur if both the data and decay values are non-zero. Note that this may result in unnecessary display updates in case the target is still present at the same level on the next scan through a given azimuth. It is possible to eliminate these redundant display updates by maintaining a history of the most recently displayed value for each range bin in the polar memory. Then the display process only need update those locations for which the new display value differs from the most recent display value.

The use of a polar buffer in the scan conversion process addresses several problems with scan conversion in a general purpose computer. The first problem is performance For software scan conversion to be possible in a general purpose computer, the computer must have enough performance to receive and integrate all of the radar data into the polar buffer. It must also have sufficient performance to perform coordinate conversion and display. However, the performance requirements of this process can be reduced by using the polar buffer. The polar buffer 22 allows the coordinate conversion process 26 to run asynchronously and possibly slower than the radar. For example, a 60 RPM radar may be sending data to the polar buffer but the computer may only be able display the data at 20 RPM because of performance limitations. The integration process preserves targets until they are drawn and the decay process fades targets only after they are drawn. In addition, by detecting changing data in the polar buffer, the display task load may be substantially reduced when a small percentage of data is changing, thus reducing resource requirements.

The second problem is multi-tasking operating system priorities. A general purpose computer with a multi-tasking operating system will divide the computer resources among the executing tasks. This priority algorithm can be devastating to real-time continuous data stream tasks. The polar buffer allows the task that writes to the polar buffer to be separated from the task that reads from the polar buffer. The task that writes to the polar buffer requires far less resources than the task reading from the polar buffer, converting coordinates and displaying data. The task writing to the polar buffer can be assigned a high priority within the operating system so that data is not lost. Then the coordinate conversion task can be assigned a lower priority and use whatever resources are available after more important work is done. This could result in a display rate slower than the radar, or an average display rate the same as the radar, but with occasional periods where the display will get behind when resources are unavailable and then will get caught up when resources are available.

The network interface buffer 36 assists with the process priority and performance problems by buffering multiple pulses of new data until they can be integrated into the polar buffer one pulse at a time through the input buffer 38. This helps with the performance problem by smoothing the processing load created by bursty delivery from the digital network. This can also help with the priority problem by allowing network data to be received into the network interface buffer 36 at a higher priority than the polar buffer integration sub-process 20.

The third problem is decaying old data. Decay provides a history of the position of moving targets while also eliminating old data from the display. The display window may have more pixels than the polar buffer. Therefore, decaying data in the polar memory requires less resources. Traditional methods of decaying data emulate the persistence of the display phosphors. These methods may cause target information to fade more quickly than necessary giving the operator less time to find the target on the display. By implementing the decay when extracting data from the polar memory, targets will stay on the screen at their actual intensity until the next scan replaces them.

The fourth problem is apex removal. Traditional methods of scan conversion may require a read-modify-write operation to the display memory to preserve target information. This is necessary in the apex area where multiple range bins map to a single pixel and for diagonal lines. When the decay process is part of extraction from the polar buffer, it is no longer possible to use the read-modify-write update operation to the display because the display would accumulate the maximum values of all targets forever. Therefore, it is necessary to perform the apex removal prior to writing to the display.

The following set of C language sub-routines, demonstrate an implementation of the polar buffer processing, and the required modifications to the scan conversion algorithm to allow apex removal prior to the display, so the display may be updated with writes only. The set of algorithms is based on the Apex Scan Convert process described in the Andrusiak, et. al., U.S. Pat. No. 6,140,955, and the changes and improvements are identified. Fundamentally, the modifications include; 1) storage of radar data received by the GetRadarInput function into the polar buffer using an integration and change detection process, 2) retrieval and decay of data from the polar buffer, 3) modifications to the apex removal in function GetApexInput to insure targets are not lost when using the write only display update technique, 4) modifications to function DrawStaircaseLine to perform apex removal on consecutive writes to the same pixel on diagonal lines, and 5) modifications to the function Draw-Pixel to only perform writes and to cancel a write if the data is not changed For clarity, only functions that are modified or added to the ApexScanConvert process described in the Andrusiak, et. al., U.S. Pat. No. 6,140,955, are presented herein.

The following algorithms are derived with the following assumptions:

Let barn be the antenna angle using binary angle measurements counting clockwise from north, where the significant bits of barn is determined by the barn resolution denoted by radar_res, input_res, or output_res.

Let the amplitude of the echo at range r be written data[r] and the corresponding change flag be written flag[r].

Let the accumulated polar buffer data for a given bearing and range be written polar_data[bam][r] and the corresponding change flag be written polar_flag[bam][r]. Assume that these arrays are globally visible, allocated and initialized prior to execution of the functions listed below. The size of the bam dimension of the polar buffer is 1 raised to the power of input_res.

Let rmin (rmax) be the minimum (maximum) range to be displayed of the totality of range cells comprising the pulse.

Let rmin and rmax denote the end points of a half open range representing the minimum inclusive and maximum exclusive ranges to be processed for the current data vector.

Let f2into denote a function which rounds a floating-point value to the nearest integer value.

Let DrawPixel( ) denote a function that updates the Cartesian display memory with the new amplitude value of the pixel at the x,y coordinates. If the pixel value is −1 indicating no change, then the update is cancelled. The DrawPixel( ) function also determines the physical x,y pixel addresses based upon the display coordinate system and returns a non-zero value if the pixel coordinates are outside of the physical display area.

Let Max( ) denote a function that returns the maximum value of two numbers.

The DrawStairCaseLine function shown in Table I is modified from the Andrusiak, et. al. patent application Ser. No. 09/221,732 to perform apex removal on consecutive pixels on diagonal lines. Each pixel to be drawn is held back from drawing until the coordinates of the next pixel are known. If they both map to the same coordinate, the maximum of the two is displayed. Otherwise, the pixel is drawn. This processing is necessary in order to perform only writes to the display and prevent a non-target (lower value) from obliterating a target (higher value). The function is also modified to use change flags that when true indicate a data item has changed from the previous scan.

TABLE I

DrawStaircaseLine( ) Algorithm

```
1.  void
2.  DrawStaircaseLine (int bam, int output_res, int rmin,
        int rmax, int *data, *flag)
3.  {
4.    float theta, dx, dy, fx, fy;
5.    int r, x, old_x, y, old_y, old_data, new_data;
6.
7.    theta = ((float)bam / (1<<output_res)) * two_pi;
8.    dx = cos(theta);
9.    dy = sin(theta);
10.   fx = (rmin+0.5) * dx;
11.   fy = (rmin+0.5) * dy;
12.   old_x = f2int(fx);
13.   old_y = f2int(fy);
14.   old_data = flag[rmin] ? data[rmin] : −1;
15.   for (r = rmin; r < rmax;) {
16.     r++;
17.     x = f2int(fx);
18.     y = f2int(fy);
19.     if ((old_y == y) && (old_x == x)) {
20.       new_data = flag[r] ? data[r] : −1;
21.       old_data = max(old_data, new_data);
22.     }
23.     else {
24.       if (DrawPixel(old_x, old_y, old_data[r]))
25.         break;
26.       if ((old_y != y) && (old_x != x))
27.         if (DrawPixel(x, old_y, old_data[r]))
28.           break;
29.       old_data = flag[r] ? data[r] : −1;
30.     }
31.     old_x = x;
32.     old_y = y;
33.     fx += dx;
34.     fy += dy;
35.   }
36. }
```

Comments on function DrawStaircaseLine( ):

1. Indicates the function does not return a value.
2. Defines the calling syntax of the function.
3. The function body begins here.

TABLE I-continued

4. Declare floating-point variables used in this function.
5. Declare integer variables used in this function.
6. Blank.
7. theta is assigned the bam number converted to radians.
8. dx is assigned the cosine of theta.
9. dy is assigned the sine of theta.
10. fx is assigned the x coordinate of the sample indexed by rmin.
11. fy is assigned the y coordinate of the sample indexed by rmin.
12. old_x is initialized to the starting x coordinate converted to an integer.
13. old_y is initialized to the starting y coordinate converted to an integer.
14. old_data is initialized to the starting data value or −1 if the corresponding flag indicates no change.
15. A loop of instructions to compute the Cartesian coordinates and plot the polar data samples from Rmin through Rmax.
16. The loop counter is incremented
17. The x coordinate is converted from floating point to integer.
18. The y coordinate is converted from floating point to integer,
19. Detects a second pixel maps to the same coordinate as the previous pixel.
20. Determines the new pixel value based on the change flag as in line 14.
21. Stores the maximum of the pixels mapping to the same coordinate for the next loop iteration.
22. The if body of 19 ends here.
23. The else condition of 19 begins here.
24. The appropriate value in the data array is plotted on the display at coordinates given by (old_x,old_y).
25. Break out of the loop if the pixel is outside the display area.
26. Detects a 'stairstep' given by both x and y coordinates changing.
27. An extra pixel is plotted ar coordinate (x,old_y).
28. Break out of the loop if the pixel is outside the display area.
29. Determines the new pixel value based on the change flag as in line 14 and stores it for the next loop iteration.
30. The else body of 24 ends here.
31. The x coordinate is saved for the next loop iteration.
32. The y coordinate is saved for the next loop iteration.
33. fx is incremented by the value dx.
34. fy is incremented by the value dy.
35. The loop ends here.
36. The finction body ends here.

The ApexScanConvert scan conversion algorithm shown in Table II is based upon the ApexScanConvert algorithm described in the Andrusiak, et. al., patent application Ser. No. 09/221,732. The modifications include removal of gap filling from ApexScanConvert which has been moved to a function to be described later. The gap-filling feature has been moved to the process that writes data to the polar buffer. The process that reads data from the polar buffer will read data from sequential azimuths in the polar buffer so gaps cannot be detected here. The process that gets radar input and writes the data to the polar buffer must detect the azimuth gaps and fill them. The other modification is the addition of the change flag data element.

TABLE II

ApexScanConvert( ) Algorithm 1. void
2. DrawApexWedge(int bam, int input_res, int output_res,
      int rmin, int rmax, int *data. int *flag)
3. {
4.   int range, radials, i;
5.
6.   bam <<= output_res − input_res;
7.   DrawStaircaseLine(bam, output_res, rmin, rmax, data, flag);
8.
9.   radials = 1<<(output_res − input_res)
10.  for (i = 1; i < radials; i++) {
11.    range = GetRegionBound(bam+i, output_res);

TABLE II-continued

12.    DrawStaircaseLine(bam+i, output_res, range/2, rmax,
          data, flag);
13.  }
14. }

Comments on function DrawApexWedge( ):

1. Indicates that the function does not return a value.
2. Defines the calling syntax of the function.
3. The function body begins here.
4. Declare integer variables used in this function.
5. Blank.
6. Convert the bam number from input resolution to output resolution.
7. Call DrawStaircaseLine( ) to draw the primary radial from range rmin.
8. Blank.
9. radials is assigned two raised to the power of the difference between the output and input resolutions. This is the number of radials to be drawn for the current wedge.
10. Loop of instructions to draw the (radials-1) additional hole-filling radials.
11. range is assigned the hole-filled range based on the resolution region of the current fill radial bam number.
12. The fill radial is drawn starting from range/2 which is already hole-filled by radials in lower resolution regions.
13. The loop ends here.
14. The function body ends here.
1. void
2. ApexScanConvert(int radar_res, int input_res, int output_res)
3. {
4.   int bam, rmin, rmax;
5.   int data[MAX_LENGTH];
6.   int flag[MAX_LENGTH];
7.
8.   while (TRUE) {
9.     GetDrawData (&bam, radar_res, input_res, &rmin, &rmax,
          data, flag);
10.    DrawApexWedge(bam, input_res, output_res, rmin,
          rmax, data, flag);
11.  }
12. }

Comments on function ApexScanConvert( ):

1. Indicates that the function does not return a value.
2. Defines the calling syntax of the function.
3. The function body begins here.
4. Declare integer variables used in this function.
5. Declare array to buffer radar input data.
6. Declare array to buffer radar input change flag data.
7. Blank
8. Begin loop to process data forever.
9. Call function GetDrawData( ) to get the next radar input and array of return values with bam resolution defined by input resolution.
10. Call function DrawApexWedge( ) to draw the received radar data at the input resolution starting ar rmin, with idle-filling to the output resolution.
11. The loop ends here.
12. The function body ends here.

The GetDrawData function shown in Table III performs the scheduling of input to and output from the polar buffer. It is the main function of the polar buffer processing. This function first gets all data available on the input queue stored into the polar buffer thus giving input data higher priority than output data. Once all input data has been stored, the next azimuth is read from the polar buffer and returned for line drawing. The function will block (not return) until the next sequential azimuth can be read from the polar buffer. The comparison of the read_bam and write_bam values prevents the function from allowing the reads from the polar buffer from passing the writes to the polar buffer and returning old data that was previously processed. This also allows the read process to catch up with the write process if it gets behind and then wait for new input.

TABLE III

GetDrawDat( ) Algorithm

```
1.  void
2.  GetDrawData(int *bam, int radar_res, int input_res,
            int *rmin, int *rmax, int *data, int *flag)
3.  {
4.    static int write_bam = 0;
5.    static int read_bam = -1;
6.
7.    read_bam = (read_bam+1) & ((1<<input_res)-1);
8.    while (1) {
9.      while (StorePolarInput(&write_bam, radar_res,
                input_res));
10.     if (read_bam != write_bam) {
11.       if (GetApexInput(read_bam, input_res, rmin, rmax,
                data, flag)) {
12.         *bam = read_bam;
13.         return;
14.       }
15.     }
16.   }
17. }
```

Comments on function GetDrawData( ):

1. Indicates that the function does not return a value.
2. Defines the calling syntax of the function.
3. The function body begins here.
4. Declare static integer variable write_bam to store the last bam input.
5. Declare static integer variable read_bam to store the last bam output.
6. Blank.
7. Increment read_bam and keep within input_res range.
8. Begin loop to process data until GetApexInput returns true.
9. Loop until StorePolarInput has processed all queued input.
10. If write_bam is ahead of read_bam then get data can be read from polar buffer.
11. Get data and change flags from read_bam and if valid then return.
12. Return the read_bam value.
13. Return from the routine.
14. The if body of 11 ends here.
15. The if body of 10 ends here.
16. The loop body of 8 ends here.
17. The function body ends here.

The StorePolarInput algorithm shown in Table IV provides the necessary functions to receive raw radar input, perform azimuth compression, and store the data in the polar buffer. This function gets radar input and stores it into the polar buffer using GetRadarInput and IntegratePolarBuffer. Since azimuth gaps may be detected here, azimuth gap filling is also performed by duplicating data in the polar buffer in the gap.

The GetRadarInput function is similar to the function of the same name in the Andrusiak, et. al. patent application Ser. No. 09/221,732. Its purpose is to get raw radar input and perform azimuth compression to input_res. The modifications are that it now returns a true value when a new compressed pulse is returned and it no longer blocks waiting for input data.

The GetRadarPulse function is system specific but its function is to return a raw radar pulse with data and its azimuth. This function would likely receive data from a digital network as described in Andrusiak et. al., U.S. Pat. No. 5,923,285. To insure data is not lost, the network would normally provide buffer space for several pulses of data. This allows the non-real-time nature of an operating system to receive this data without loss and store it in the polar buffer when resources are available The combination of a network buffer and the polar buffer are critical to processing real-time data in a non-real-time processing environment.

The IntegratePolarInput function detects data elements that have changed since the last write to the polar buffer and sets the change flag accordingly. It then stores the maximum of the old and new data into the polar memory in order to preserve target information. The arrays polar-data and polar-flag are assumed to be large global array variables sized properly to store the necessary polar data.

TABLE IV

StorePolarInput( ) Algorithm

```
1.  int
2.  GetRadarInput (int *bam, int radar_res, int input_res,
            int *rmax, int *data)
3.  {
4.    static int old_data[MAX_LENGTH];
5.    static int old_bam = -1;
6.    int new_data[MAX_LENGTH];
7.    int new_bam, i;
8.
9.    while (TRUE) {
10.     if (!GetRadarPulse(&new_bam, radar_res, rmax, new_data);
11.       return 0;
12.     if (radar_res > input_res)
13.       new_bam >>= radar_res - input_res;
14.     else
15.       new_bam <<= input_res - radar_res;
16.     if (old_bam == -1)
17.       old_bam = new_bam;
18.     if (new_bam != old_bam) {
19.       *bam = old_bam;
20.       old_bam = new_bam;
21.       for (i = 0; i < *rmax; i++) {
22.         data[i] = old_data[i];
23.         old_data[i] = new_data[i];
24.       }
25.       return 1;
26.     }
27.     for (i = 0; i < *rmax; i++)
28.       old_data[i] = max(new_data[i], old_data[i]);
29.   }
30. }
```

Comments on function GetRadarInput( ):

1. Indicates that the function does not return a value.
2. Defines the calling syntax of the function.
3. The function body begins here.
4. Declare static array to preserve radar-input data between functions calls. This array is assumed to be initialized to zero before program execution.
5. Declare static variable to preserve radar-input bam between functions calls and initialize to an invalid bam number.
6. Declare array to buffer input data from radar.
7. Declare integer variables used in this function.
8. Blank.
9. Outer loop of instructions to get and process radar data pulses.
10. Call GetRadarPulse( ) to obtain the next bam and radar return data. If no data then return to prevent routine from blocking.
11. Return false if no input data.
12. Convert the bam number from radar resolution to input resolution.
13. When radar resolution is greater, right shift by resolution difference.
14. Else clause executed when if condition in line 11 is false.
15. When input resolution is greater, left shift by resolution difference.
16. Detect very first loop iteration.
17. On very first loop iteration initialize old_bam to new_bam.
18. Detect when bam number, converted to input resolution, changes.
19. Return old_bam number.
20. Save new bam number in static variable old_bam.
21. Inner loop of instructions to iterate through each element of data vectors.
22. Accumulated data in old_data is copied to be returned in data array.
23. new_data is saved for next function call in static old_data array.
24. The inner loop started at statement 20 ends here.
25. The function returns to the calling routine after detecting a bam change.
26. End of the list of statements executed when statement 17 evaluates true.
27. Loop to iterate through each element of the data vectors.
28. Use the old_data array to save the maximum value from corresponding range cells of the new_data and old_data arrays.

TABLE IV-continued

StorePolarInput( ) Algorithm

29. The outer loop started at statement 9 ends here.
30. The function body ends here.

```
1.  void
2.  IntegratePolarInput(int bam, int rmax, int *data)
3.  {
4.     int r;
5.
6.     for (r = 0; r < ramx; r++) {
7.        if (polar_data[bam][r] != data[r])
8.           polar_flag[bam][r] = 1;
9.        polar_data[bam][r] = max(polar_data[bam][r], data[r]);
10.    }
11.    polar_data[bam][r] = −1;
12. }
```

Comments on function IntegratePolarInput( ):

1. Indicates that the function does not return a value.
2. Defines the calling syntax of the function.
3. The function body begins here.
4. Declare local integers;
5. Blank.
6. Begin loop for to store all data from radar pulse into polar buffer.
7– If new data does not equal old data, set change clag in polar buffer.
8.
9. Write maximum of old and new data into polar buffer.
10. Loop body ends here.
11. Mark end of data in polar buffer with −1.
12. Function body ends here.

```
1.  int
2.  StorePolarInput(int *bam, int radar_res, int input_res)
3.  {
4.     int rmax, mask;
5.     int data[MAX_LENGTH];
6.     static int old_bam_plus_2 = −1;
7.
8.     maxk = (1<<input_res)−1;
9.     if (!GetRadarInput(bam, radar_res, input_res, &rmax, data))
10.       return 0;
11.    if (*bam == old_bam_plus_2)
12.       IntegratePolarInput((*bam−1) &mask, rmax, data);
13.    old_bam_plus_2 = (*bam + 2) & mask;
14.    IntegratePolarInput(*bam, rmax, data);
15.    return 1;
16. }
```

Comments on function StorePolarInput( ):

1. Indicates that the function returns a value.
2. Defines the calling syntax of the function.
3. The function body begins here.
4. Declare local integer variables.
5. Declare local buffer to pass data from GetRadarInput to IntegratePolarInput.
6. Declare and initialize local static local variable to invalid BAM number.
7. Blank.
8. mask is assigned two raised to the power of the input resolution, minus 1.
9. Call function GetRadarInput( ) to get the next radar input and array of return values with bam resolution defined by input resolution.
10. Return flase if no input data exists.
11. If exactly 1 wedge was skipped, fill it using the current radar data.
12. Call IntegratePolarInput to duplicate data at bam−1 in polar buffer.
13. old_bam_plus_2 is assigned bam+2, masked to the input resolution.
14. Call IntegratePolarData to store data in polar buffer.
15. Return true since new data was store in polar buffer.
16. The function body ends here.

The GetApexInput algorithm shown in Table V is an improvement of the GetApexInput function of the Andrusiak, et. al. patent application Ser. No. 09/221,732. The modifications include calling GetPolarInput instead of GetRadarInput to get input from the polar buffer. The GetPolarInput function copies the polar buffer data corresponding to the specified bam from the polar memory into the data and flag buffers. Then it decays the polar buffer data corresponding to the specified bam in the polar memory.

The GetApexInput function is modified to call GetPolarInput and process the change flags in addition to the data. The apex removal process is also modified slightly to hold back one higher resolution region of data. This insures that targets from one barn are not overwritten by the next bam. It has the side effect of potentially growing the size of a target by an extra pixel. This allows the display update to be performed as a write only instead of a read-modify-write.

TABLE V

GetApexInput( ) Algorithm

```
1.  void
2.  GetPolarInput (int bam, int *rmax, int *data, int *flag)
3.  {
4.     int r;
5.
6.     for (r = 0; r < MAX_LENGTH; r++) {
7.        data[r] = polar_data[bam][r];
8.        flag[r] = polar_flag[bam][r];
9.        if (data[r] < 0) {
10.          *rmax = r;
11.          break;
12.       }
13.       if ((polar_data[bam][r] != 0) && decay_value != 0)) {
14.          polar_flag[bam][r] = 1;
15.          if (pokar_data[bam][r] > decay_value)
16.             polar_data[bam][r] −= decay_value;
17.          else
18.             polar_data[bam][r] = 0;
19.       }
20.    }
21. }
```

Comments on function GetPolarInput( ):

1. Indicates that the function does not return a value.
2. Defines the calling syntax of the function.
3. The function body begins here.
4. Declares local integers.
5. Blank.
6. Loop begins to extract specified bam or data from polar buffer, decay it and write it backl.
7. Copy data item from polar buffer.
8. Copy change flag from polar buffer.
9. End loop early when end of data buffer is reached.
10. Return rmax.
11. End loop.
12. Body of if 9 end here.
13. If polar data is greater than 0 then decay;
14. Set change flag to true.
15– If data is greater than decay value then subtracts decay value
18. else set to 0.
19. Body of if 13 end here.
20. Body of loop 6 ends here.
21. Body of function ends here.

```
1.  int
2.  GetApexInput(int *bam, int input_res, int *rmin, int rmax,
            int *data)
3.  {
4.     static int old_data[MAX_LENGTH], old_flag
          [MAX_LENGTH];
5.     static int old_bam = −1;
6.     static int old_range = 0;
7.     int new_data[MAX_LENGTH], new_flag[MAX_LENGTH];
8.     int new_range, new_bam, i;
9.
10.    if (old_bam == −1) {
11.       GetPolarInput (&old_bam, rmax, old_data, flag);
12.       old_bam = bam;
13.       old_range = 0;
14.       return 0;
15.    }
16.    GetPolarInput(bam, rmax, new_data, flag);
17.    new_range = GetRegionBound(new_bam, input_res) / 2;
18.    for (i = 0l i < old_range * 2; i++) {
19.       old_data[i] = max[old_data[i], new_data[i]);
20.       old_flag[i] = new_flag[i];
21.    {
22.    for (I = old_range; 1 < *rmax; i++) {
```

TABLE V-continued

```
23.    data[i] = old_data[i];
24.    flag[i] = old_flag[i];
25.    old_data[i] = new_data[i];
26.    old_flag[i] = new_flag[i];
27.    }
28.    old_bam = new_bam;
29.    *rmin = old_range;
30.    old_range = new_range;
31.    return 1;
32. }
```

Comments on function GetApexInput( ):

1. Indicates that the function does not return a value.
2. Defines the calling syntax of the function.
3. The function body begins here.
4. Declare static array to preserve radar input data between function calls. This array is assumed to be initialized to zero before program execution.
5. Declare static variable to preserve radar-input bam between function calls and initialize to an invalid bam number.
6. Declare static variable to preserve minimum range of data saved in old_data.
7. Declare array to buffer input data from radar.
8. Declare integer varibale used in this function.
9. Blank.
10. Detect very first call to this function.
11. Call function GetPolarInput( ) to initialize old_bam and old_data.
12. Initialize old_bam to first bam.
13. Initialize old_range to zero to indicate the entire old_data buffer is valid.
14. Return false to indicate no data returned.
15. End of the list of statements executed when statement 10 evaluates true.
16. Call function GetPolarInput( ) to get the next radar input and array of return values.
17. new_range is assigned range already hole-filled by radials at lower resolution regions, which is half of the hole-filled range for the new bam number.
18. Loop of instructions to sequence through array indexes from 0 to (old_range-1) * 2. The times 2 factor insures data is saved in the up to the next higher resolution region to prevent targets from being lost by overlap of the next bam.
19. Use the old_data array to save the maximum value from corresponding range cells of the new_data and old_data arrays.
20. Use the old_flag array to save the change flags corresponding to the old_data array.
21. End of the loop started at line 18.
22. Loop of instructions to sequence through remaining array indexes from old_range to the maximum radar return range rmax.
23. Return the accumulated old_data in array data[ ].
24. Return the corresponding change flags for array data [ ].
25. Use the old_data array to preserve the remaining new_data values,
26. Preserve the change flags corresponding to the old_data array.
27. End of loop started at line 21.
28. Save new bam number in static variable old_bam.
29. Return old_range in variable rmin.
30. new_range is preserved in the static old_range variable.
31. Return true to indicate data valid.
32. The function body ends here

What is claimed is:

1. A method of processing real-time input target identification data that has a repetitive scan pattern for scan conversion and is presented on the display of a digital computer comprising:
    (a) integrating said input target identification data into at least one polar data buffer memory with previously stored target identification data;
    (b) extracting stored target identification data from said polar data buffer memory for presentation on said display at an extraction rate that may differ from said integration rate; and
    (c) applying a decay rate to modify selected stored target identification data in said polar data buffer memory following extraction of said target identification data for presentation on said display.

2. A method as claimed in claim 1, wherein change detection flags are processed to allow selective updating of the display to reduce redundant display update operations, comprising:
    (a) during said integration step, setting said change detection flags for target identification data that was changed in said polar data buffer since the previous extraction of said target identification data;
    (b) during said extraction step, clearing said change detection flags; and
    (c) during said decay step, re-setting said change detection flags for target identification that is modified by the decay sub-process.

3. A method as claimed in claim 2, comprising the additional steps of; determining the maximum range of any target identification data that was changed for each radial in said polar data buffer during the integration step and using this maximum range to limit the range of the target identification data which is processed during the extraction step.

4. A method as claimed in claim 1, comprising the additional steps of receiving each of a plurality of target identification data streams from a different target identification data source, and integrating each of said plurality of said target identification data streams into a polar data buffer memory to allow for extraction and presentation of said target identification data on a display.

5. A method as claimed in claim 1, comprising the additional steps receiving each of a plurality of target identification data streams from a different target identification data sources integrating each of said plurality of said target identification data streams into a polar data buffer memory that is functionally unique for each of said target identification data streams to allow for the separate extraction and presentation of said target identification data of each of said target data streams on a display, and applying a separate decay rate to the data stored for each of said target identification data streams, which decay rates do not necessarily have the same values.

6. In a process for scan conversion of target identification data based upon polar coordinates to target identification data, based upon rectangular coordinates in a programmable digital computer, wherein said target identification data based on polar coordinates, is supplied to said digital computer and comprises antenna angle (θ), and echo amplitude range (r) data, and said digital computer supplies target identification data based on rectangular coordinates which control (x,y) defined pixels of a viewing area on a monitor display, comprising:
    (a) drawing a plurality of radial lines from an origin, each of which lines is associated with an azimuthal resolution region wherein said radial lines bisect the aggregate group of all radial lines associated with all lower azimuthal resolution regions; and
    (b) modifying the drawing of said plurality of radial lines of step (a), by filling in the pixels left unfilled when the drawing of any of said radial lines changes by one pixel in both the x and y dimensions;
the improvement comprising:
    detecting consecutive polar coordinate target identification data bits which map into the same Cartesian coordinate target identification data bits and mapping said consecutive polar coordinate target identification data bits into said Cartesian coordinate data bits in a single display update.

7. In a process for scan conversion of target identification data, based upon polar coordinates to target identification data based upon rectangular coordinates in a programmable digital computer, wherein said target identification data based on polar coordinates is supplied to said digital computer and comprises antenna angle (θ), and echo amplitude range (r) data, and said digital computer supplies target identification data based on rectangular coordinates which control (x,y) defined pixels of a viewing area on a monitor display, comprising:

(a) drawing a plurality of radial lines from an origin, each of which lines is associated with a azimuthal resolution region, wherein said radial lines bisect the aggregate group of all radial lines associated with all lower azimuthal resolution regions;

(b) modifying the drawing of said plurality of radial lines of step (a) by filling in the pixels left unfilled when the drawing of any of said radial lines changes by one pixel in both the x and y dimensions, and (c) performing polar apex removal in order to minimize drawing of redundant pixel displays by:
  1. determining the resolution region number corresponding to the azimuth number of each of said radial lines; and
  2. using the resolution region number of step (c)(1) to determine the hole-filled x or y range produced by the aggregate radial pattern comprising all radial lines in lower resolution regions, the improvement comprising:

compressing and saving echo amplitude range data of consecutive pulses of target input data up to twice said hole-filled x or y range, in correspondence with said hole-filled range for the current radial line in order to prevent overwriting of said target identification data with non-target identification data when the drawing of consecutive radials overlaps on said display.

8. In a process as claimed in claim 7, the further improvement comprising detecting consecutive polar coordinate target identification data bits which map into the same Cartesian coordinate target identification data bits and mapping said consecutive polar coordinate target identification data bits into said Cartesian coordinate target identification data bits in a single display update.

9. In a method of converting and displaying target identification data supplied by one or more analog target identification systems, each of which have separate processors coupled to one or more displays over a digital network wherein each of said systems proceeds by:

(a) digitizing analog video data and range data;

(b) digitizing azimuth analog data, which is representative of the azimuth of one or more antennas associated with a particular source of target identification data;

(c) applying range compression to said digital video data and said digital range data to provide compressed digital video data;

(d) applying window detection to said range compressed digital video data and said digital azimuth data to provide digital window detected data, and (e) transmitting said digital window detected video data over said digital network to said displays and control signals from said displays to said processors for selecting the images to be displayed on said displays; and the improvement comprising:

(a) integrating said digital window detected video data into at least one polar data buffer memory with previously stored digital window detected video data;

(b) extracting stored digital window detected video data from said polar data buffer memory for presentation on said display at an extraction rate that may differ from said integration rate; and (c) applying a decay rate to modify selected stored digital window detected video data in said polar data buffer memory following extraction of said stored digital window detected video data for presentation on said display.

10. A method as claimed in claim 9, to allow selective updating of the display to reduce redundant display update operations, comprising:

(a) during said integrating step, setting change detection flags for target identification data that was changed in said polar data buffer since the previous extraction of said target identification data;

(b) during said extracting step, clearing said change detection flags; and, (c) during said applying of said decay step, re-setting said change detection flags for target identification data that is modified by said decay step.

11. A method as claimed in claim 9, comprising the additional steps of determining the maximum range of any target identification data that was changed for each radial in said polar data buffer during the integrating step and using this maximum range to limit the range of the target identification data which is processed during the extracting step.

12. A method as claimed in claim 9, wherein each of a plurality of target identification data streams are received from a different target identification data source, and said plurality of said target identification data streams are integrated into a polar data buffer memory for extraction and presentation on a display.

13. A method as claimed in claim 9, wherein each of a plurality of target identification data streams are received from a different target identification data source, and each of said plurality of said target identification data streams is integrated into a polar data buffer memory for extraction and presentation on a display, and whereby said decay rate may have a different value for each of said polar data buffer memories corresponding to each of said target identification data streams.

* * * * *

UNITED STATES PATENT AND TRADEMARK OFFICE
CERTIFICATE OF CORRECTION

PATENT NO. : 6,211,814 B1  
DATED : April 3, 2001  
INVENTOR(S) : Benjamin et al.

Page 1 of 1

It is certified that error appears in the above-identified patent and that said Letters Patent is hereby corrected as shown below:

<u>Title page,</u>
Item [73], Assignee should read as follows:
-- Assignee: Lockheed Martin Corporation --

Signed and Sealed this

Twenty-first Day of May, 2002

*Attest:*

*Attesting Officer*

JAMES E. ROGAN
*Director of the United States Patent and Trademark Office*